United States Patent [19]

Nishimura

[11] Patent Number: 5,005,745
[45] Date of Patent: Apr. 9, 1991

[54] APPARATUS FOR PREVENTING TAPE FROM BEING ROLLED

[75] Inventor: Shozo Nishimura, Tokyo, Japan

[73] Assignee: Tanashin Denki Co. Ltd., Shinmachi, Japan

[21] Appl. No.: 465,977

[22] Filed: Jan. 16, 1990

[30] Foreign Application Priority Data

Feb. 23, 1989 [JP] Japan .................. 1-20756[U]

[51] Int. Cl.⁵ .................. B65H 26/04; B65H 59/38; G11B 15/43
[52] U.S. Cl. .................. 226/24; 226/157; 226/160; 226/161; 242/191
[58] Field of Search .................. 226/24, 25, 157, 160, 226/161, 26; 242/57, 191

[56] References Cited

U.S. PATENT DOCUMENTS

| 3,159,324 | 12/1964 | Ham, Jr. et al. | 226/157 X |
| 3,610,495 | 10/1971 | Murayama et al. | 226/24 |
| 4,145,963 | 3/1979 | Leslie et al. | 226/25 X |
| 4,234,139 | 11/1980 | Porchia | 242/191 |
| 4,269,373 | 5/1981 | Tsuchiya et al. | 242/191 |
| 4,359,178 | 11/1982 | Hayashi et al. | 226/25 |
| 4,494,712 | 1/1985 | Godwin, Jr. et al. | 242/210 X |

FOREIGN PATENT DOCUMENTS 50-27301 8/1975 Japan .

Primary Examiner—Lenard A. Footland
Assistant Examiner—Paul Bowen
Attorney, Agent, or Firm—Liberman, Rudolph & Nowak

[57] ABSTRACT

An apparatus for preventing tape from being rolled on a capstan or pinch roller including a pinch roller having a ratchet wheel rotated integrally with the pinch roller, a tape contacting plate having a pawl capable of engaging the ratchet wheel, and a resilient plate for providing a biasing force in response to tape tension is provided. The pinch roller is usable to rotate when the tape becomes lose and is able to rotate when the tape becomes taut.

6 Claims, 3 Drawing Sheets

APPARATUS FOR PREVENTING TAPE FROM BEING ROLLED

FIELD OF THE INVENTION

The present invention relates generally to a tape recorder and more particularly, to an apparatus for preventing a tape from being rolled on a capstan or a pinch roller of the tape recorder.

BACKGROUND OF THE INVENTION

In the tape recorder, a tape is engaged in between the capstan and the pinch roller, moved by the rotation of the capstan, and wound on a take-up reel. In this movement, if the rotation of the take-up reel is disturbed for any reason, the tape becomes loose so that it might be rolled on the capstan or the pinch roller.

Also, if the tape becomes loose. The tape cassette during non-use, the same problem may arise at the time of starting a take-up operation.

When the tape is rolled on the capstan or the pinch roller, the tape breaks down or the tape cassette cannot be drawn out. Therefore, in a conventional tape recorder several means have been utilized to solve these problems. First, as a mechanical means, it is possible to prevent the tape from being rolled on the capstan or the pinch roller by making an opening on the pinch roller arm which supports the pinch roller to be rotated, and discharging the relaxed tape through the opening. Second, as a electrical means, it is possible to prevent the tape from being rolled on the capstan or the pinch roller by mounting a photosensor in the vicinity of the capstan, and producing an electric signal in the photosensor to detect a relaxed tape and stop the drive motor, or by electrically detecting a change in the rotation speed of the reel from a given range of rotation speeds so as to stop the drive motor.

However, there have been some problem in both means. In the mechanical means, it is difficult to prevent the tape from being rolled when the relaxed tape is not exactly discharged through the opening. In the electrical means, the device is complicated and the cost is high because it requires photosensors, electric circuits, and so forth.

SUMMARY OF THE INVENTION

It is a general object of the present invention to provide an improved apparatus for preventing a tape from being rolled on the capstan or the pinch roller which avoids the disadvantages of prior techniques, while affording additional advantages of low cost and simple design.

In order to achieve the object of the invention, the invention provides an apparatus for preventing a tape from being rolled on a capstan or a pinch roller including a pinch roller having a ratchet wheel to be rotated integrally with said pinch roller, a tape contacting plate having a pawl to be engaged with said ratchet wheel and introducing into a tape cassette when said pinch roller is pushed toward the capstan, and a resilient means manifesting a force in the direction which said pawl is intended to be engaged with said ratchet wheel, wherein said pinch roller is not able to rotate where the tape becomes loose and then said pawl engages said ratchet wheel, and wherein said pinch roller is able to rotate where the tape becomes tight to be taken up, said tape contacting plate manifests a force against the resilient force of the resilient means, and then said pawl releases from said ratchet wheel.

Preferably, the tape contacting plate is mounted on the pinch roller arm rotatably supporting the pinch roller.

In addition, it is preferable to form the tape contacting plate integrally with the resilient means by plastic.

Where the tape becomes loose, the tape contacting plate is introduced into the tape cassette and the pawl is engaged with the ratchet wheel. Accordingly, the pinch roller cannot rotate and tape is prevented from being rolled on the capstan or the pinch roller.

When the taken-up tape becomes tight, the tape contacting plate manifests a force against the resilient force of the resilient means. Accordingly, the pawl releases from the ratchet wheel.

BRIEF DESCRIPTION OF THE DRAWINGS

The preferred embodiments of the invention will now be described, by way of example, with reference to the accompanying drawings in which.

DETAILED DESCRIPTION OF THE INVENTION

Figure 1:
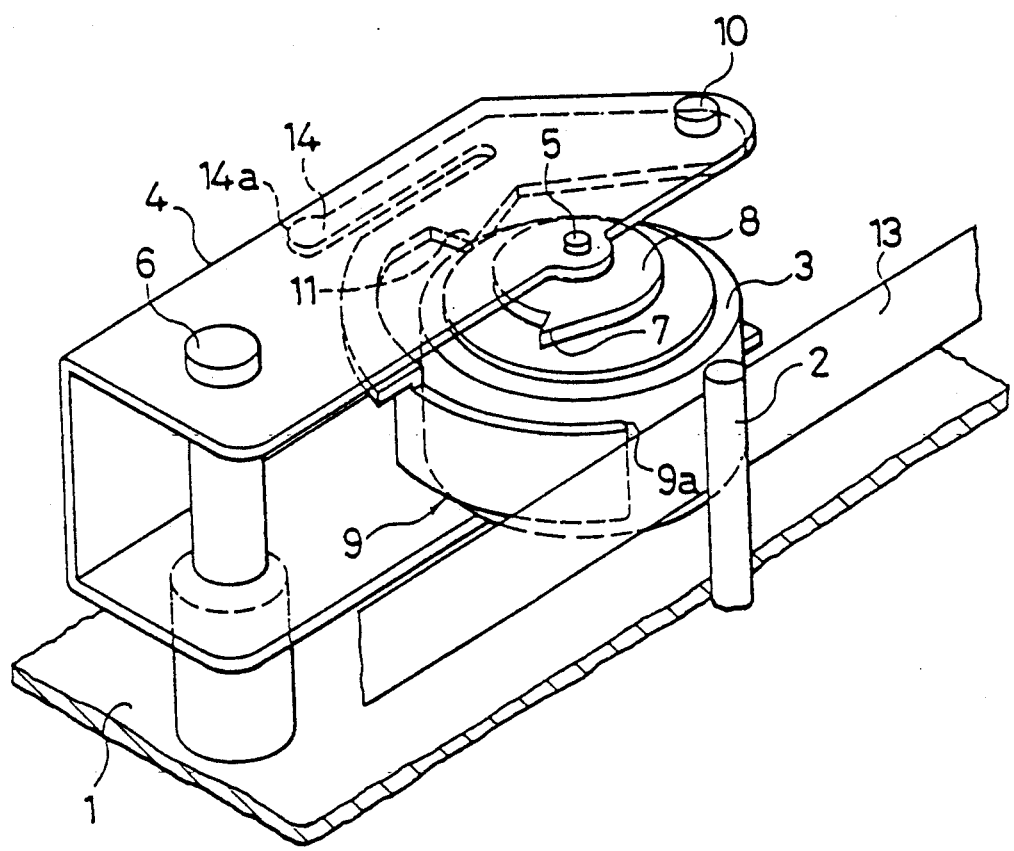
FIG. 1 is a perspective view of the apparatus according to the first embodiment of the invention.
Figure 2:
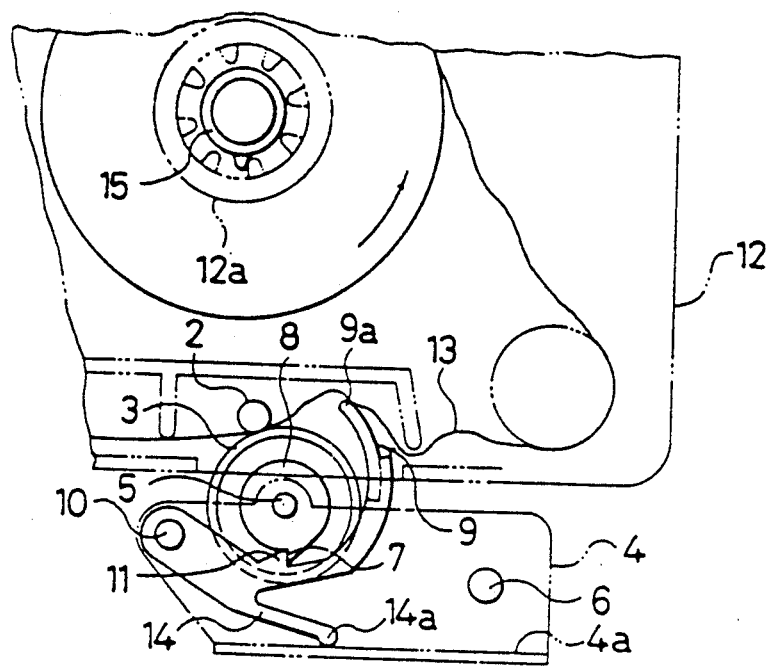
FIG. 2 and FIG. 3 are views to explain the operation of the apparatus shown in FIG. 1 where the tape becomes loose and tight, respectively.

Referring now to the drawings wherein like reference numerals designate like or corresponding elements through the views, and particularly referring to FIG. 1, there is illustrated the first embodiment of the apparatus for preventing the tape from being rolled on the capstan or the pinch roller. The capstan 2 is rotatably mounted on the base plate 1 of the tape recorder. The pinch roller 3 is attached to or detached from the capstan 2. The pinch roller 3 is rotatably supported by the small shaft 5 of the pinch roller arm 4. The pinch roller arm 4 is rotatably supported by the large shaft 6 on the base plate 1. The disc 8 is integrally and rotatably mounted on the top of the pinch roller 3. The disc 8 includes a ratchet wheel 7. The tape contacting plate 9 is movably supported by the juncture 10 in the pinch roller arm 4. This tape contacting plate 9 may be formed of plastic. The pawl 11 is protruded in the central portion of one side of the tape contacting plate 9. The front end side which is opposite to the juncture 10 is bent according to the circumference of the pinch roller 3. The front end 9a of the bent portion contacts the tape 13 in the tape cassette 12 (FIG. 2). The tape contacting plate 9 is formed integrally with the resilient plate 14 (the resilient means) and forced to be bent by the force of the resilient plate in the direction (counterclockwise in the Figures) which the pawl 11 is intended to be engaged into the ratchet wheel 7. The front end 14a of the resilient plate 14 contacts the inner surface 4a of the pinch roller arm 4.

Figure 3:
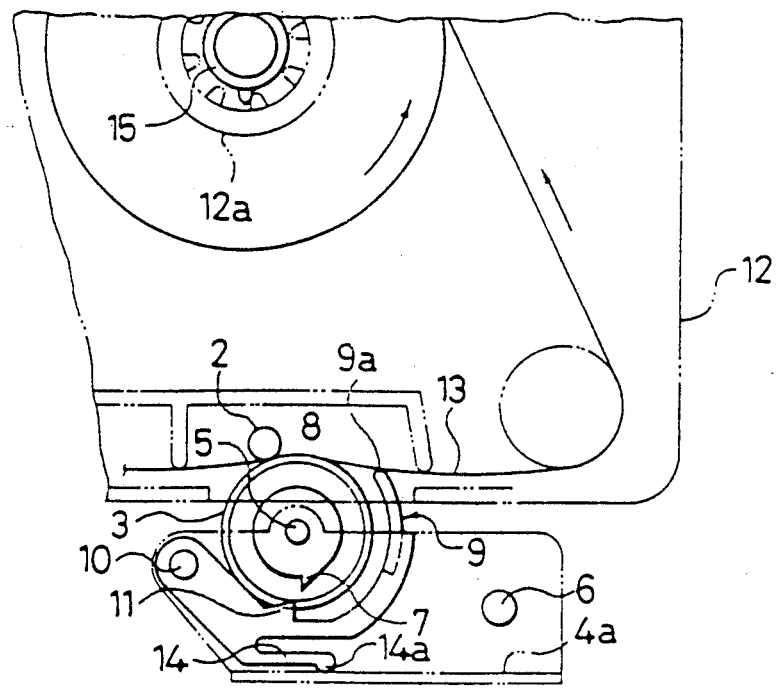

Referring now to the FIG. 2 and FIG. 3, the operation of the apparatus according to the first embodiment of the invention will be explained.

At first, the hub 12a of the tape cassette 12 is engaged in the take up reel 15. The tape 13 is taken up in the direction of the arrow. The pinch roller 3 is moved toward the capstan 2 when the play starts. The tape 13 runs between the capstan 2 and the pinch roller 3 so as to be rolled on the take-up reel 15. When the tension of the tape is removed by releasing the tape 13 in the portion between the capstan 2 and the take up reel 15, the tape contacting plate 9 is forced to move counterclockwise by the resilient force of the resilient plate 14 and introduce into the tape cassette 12 so that pawl 11 is engaged with the ratchet wheel 7. Accordingly, this causes the pinch roller 3 not to rotate and the tape positioned backward of the capstan 2 not to run so as to prevent the tape from being rolled on the capstan 2 or the pinch roller 3.

On the other hand, the tape 13 is taken up when the take up reel 15 rotates in the direction of the arrow. The tape 13 positioned between the capstan 2 and the take up reel 15 is tightened. The tension of the tape causes to push the tape contacting plate 9 down clockwise against the resilient force of the resilient plate 14. Accordingly, the pawl is released from the ratchet wheel 7 so as to permit the rotation of the pinch roller 3. As a result, the tape 13 runs in the direction of the arrow to replay as shown in FIG. 3.

In this embodiment, since the pawl 11 is formed in the vicinity of the juncture 10 which is a base shaft to move the tape contacting plate 9, the pawl 11 is easily released from the ratchet wheel 7 by the rate of lever although the tension of the tape (that is, pressure to the tape contacting plate 9) is weak.

Figure 4:
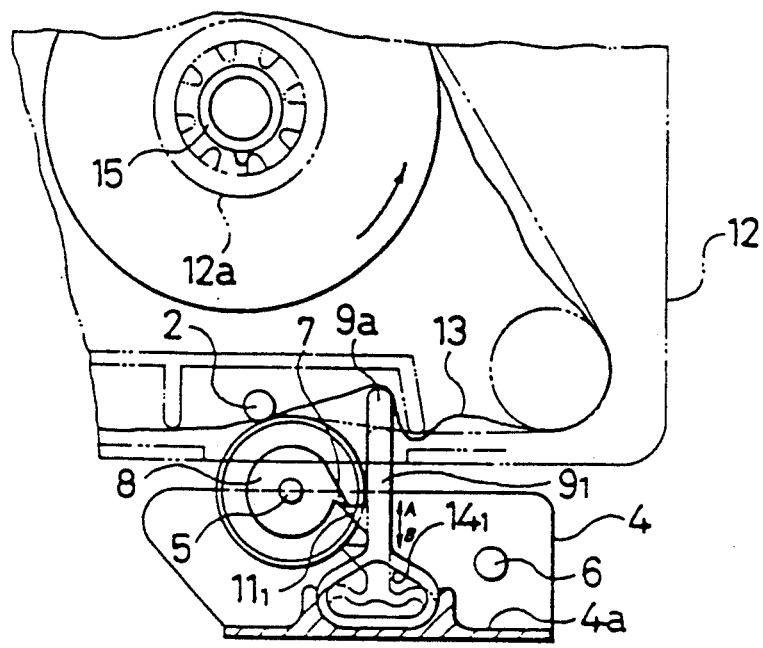
FIG. 4 is a plan view of the apparatus according to the second embodiment of the invention.

Referring now to FIG. 4, the second embodiment of the invention will be explained. The most important difference is in the tape contacting plate. The tape contacting plate $9_1$ in this embodiment is formed by a linear shape. The pawl $11_1$ and the resilient ring $14_1$ (the resilient means) are formed integrally on the lower portion thereof. The resilient ring 14 is partially secured to the inner surface 4a of the pinch roller arm 4.

When there is no tension in the tape 13, the tape contacting plate $9_1$ is upwardly moved in the direction of the arrow A by the repelling force of the resilient ring $14_1$ so that the pawl $11_1$ is engaged with the ratchet wheel 7 integrally rotated with the pinch roller 3. This causes the pinch roller 3 not to rotate.

When there is tension in the tape 13, the tape contacting plate $9_1$ is downwardly moved in the direction of the arrow B by the tensioning force of tape 13 manifested against the repelling force of the resilient ring $14_1$ so that the pawl $11_1$ is released from the ratchet wheel 7. This allows the pinch roller 3 to rotate.

Figure 5:
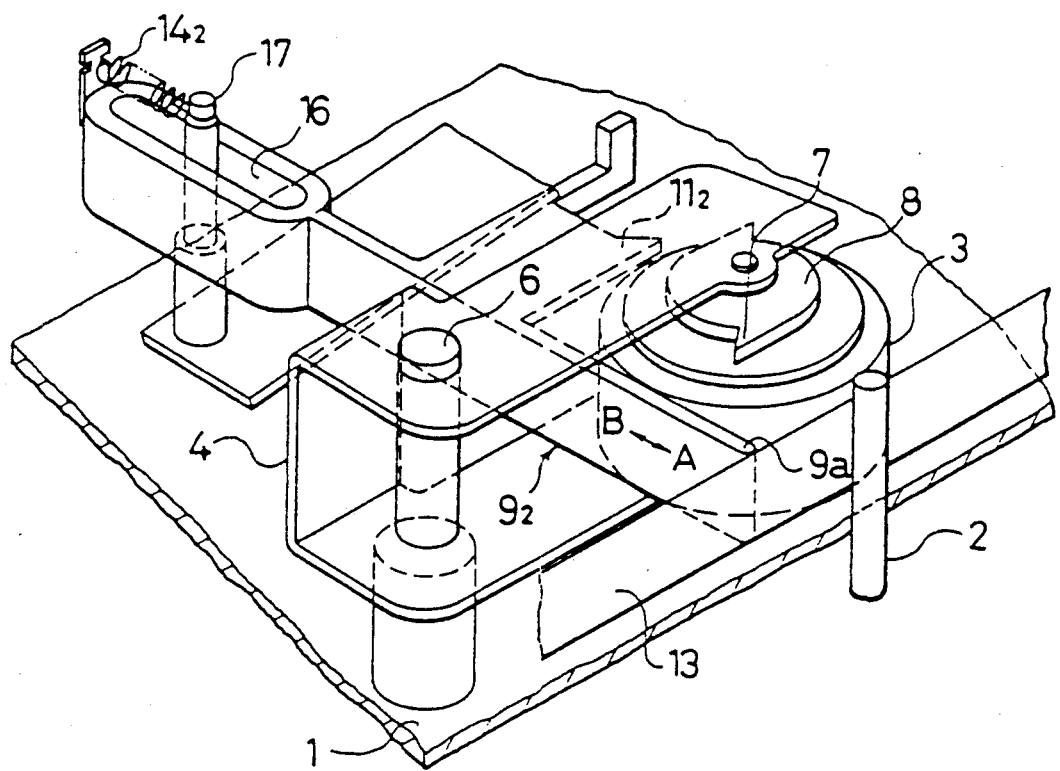
FIG. 5 is a perspective view of the apparatus according to the third embodiment of the invention.

FIG. 5 shows the third embodiment of the invention.

There are following differences between the first and the third embodiment:

(A) There are two ratchet wheels opposed about 180° each other on the circumferential of the disc 8, (B) The tape contacting plate is formed by a linear shape, and (C) The resilient means includes a coil spring.

The pawl $11_2$ is mounted on approximately central portion of one side of the tape contacting plate $9_2$. The rear end thereof opposed to the front end 9a includes a long hole 16. A fixed shaft 17 is mounted on the base plate 1. The tape contacting plate $9_2$ is movable forwardly or rearwardly in the direction of arrow A or B based on the fixed shaft 17 within the range of the long hole 16.

The tape contacting plate $9_2$ is normally biased in the direction of arrow A (that is a direction of which the pawl $11_2$ becomes engaged with the ratchet wheel 7) by the coil spring $14_2$ (the resilient means) mounted between the rear end portion thereof and the fixed shaft 17.

When there is no tension in the tape 13, the tape contacting plate $9_2$ is forwardly moved in the direction of arrow A by the coil spring $14_2$ so that the pawl $11_2$ is engaged with the ratchet wheel 7 integrally rotated with the pinch roller 3. This causes the pinch roller 3 not to rotate.

When there is tension in the tape 13, the tape contacting plate $9_2$ is rearwardly moved in the direction of arrow B by the tensioning force of the tape 13 manifested against the contractile force of the coil spring $14_2$ so that the pawl $11_2$ is released from the ratchet wheel 7. This allows the pinch roller 3 to rotate.

In the apparatus for preventing the tape from being rolled on the capstan or the pinch roller as described above, the pinch roller includes a ratchet wheel to be rotated integrally with said pinch roller. The tape contacting plate includes the pawl to be engaged with said ratchet wheel and introduces into the tape cassette when said pinch roller is pushed toward the capstan. The resilient means manifests a force in the direction which said pawl is intended to be engaged with said ratchet wheel. The pinch roller is not able to rotate where the tape becomes loose and then said pawl engages said ratchet wheel. The pinch roller is able to rotate where the tape becomes tight to be taken up, and then said tape contacting plate manifests a force against the resilient force of the resilient means, and then said pawl releases from said ratchet wheel.

Accordingly, the invention provides the apparatus for surely preventing the tape from being rolled on the capstan or the pinch roller with simple structure and low cost. It is not complicated or difficult to mount the tape contacting plate because it can be simply mounted on the pinch roller arm.

Preferably, both the resilient means and the tape contacting plate are formed integrally with plastic in view of more simple structure and fabrication and lower cost.

Other advantages will be evident to those skilled in the art.

Although particular embodiments of the invention have been illustrated in the accompanying drawings and described in the foregoing detailed description, it will be understood that the invention is not limited to the embodiments disclosed, but is intended to embrace any alternatives, equivalents, substitutions and/or rearrangements of elements falling within the scope of the invention as defined by the following claims.

What is claimed is:

1. An apparatus for preventing tape from being rolled on a capstan or pinch roller in contact with one another, which comprises:
   (a) said pinch roller having a ratchet wheel attached thereto, the pinch roller and ratchet wheel together being simultaneously rotatable about a shaft;
   (b) a tape-contacting plate having a pawl capable of engaging the ratchet wheel, the tape contacting plate being movable from a first tape-contacting position in which the pawl does not engage the ratchet wheel to a second non-tape contacting position in which the pawl engages the ratchet wheel and stops rotation of the pinch roller; and
   (c) means for moving the tape-contacting plate between the first position and the second position, the means being capable of exerting a biasing force against a tape, the force being sufficient to move the tape-contacting plate from the first position to the second position in the absence of force exerted by a taut tape.

2. An apparatus of claim 1 further comprising a pinch roller arm connected to the shaft and constructed in such a manner so as to support the shaft and pinch roller in a position parallel to the capstan.

3. An apparatus of claim 5, wherein the tape-contacting plate is pivotably mounted on the pinch roller arm.

4. An apparatus of claim 1, wherein means for moving the tape-contacting plate comprise a resilient material having one end connected to the tape-contacting plate and having a second end terminating at an immovable point.

5. An apparatus of claim 1, wherein the resilient material and the tape-containing plate are a single unit.

6. An apparatus of claim 5, wherein the single unit is formed of plastic.

* * * * *